Aug. 24, 1937.　　　F. E. ARNDT　　　2,090,776
ROAD GRADER
Filed June 7, 1934　　　3 Sheets-Sheet 1
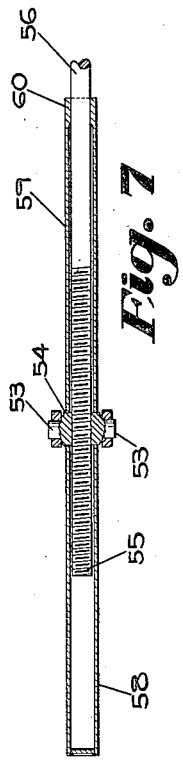
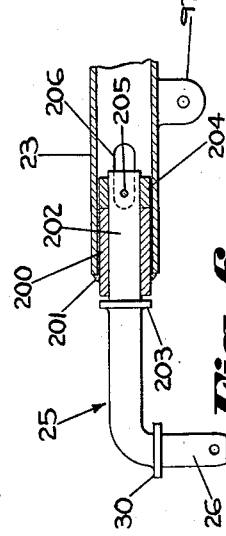
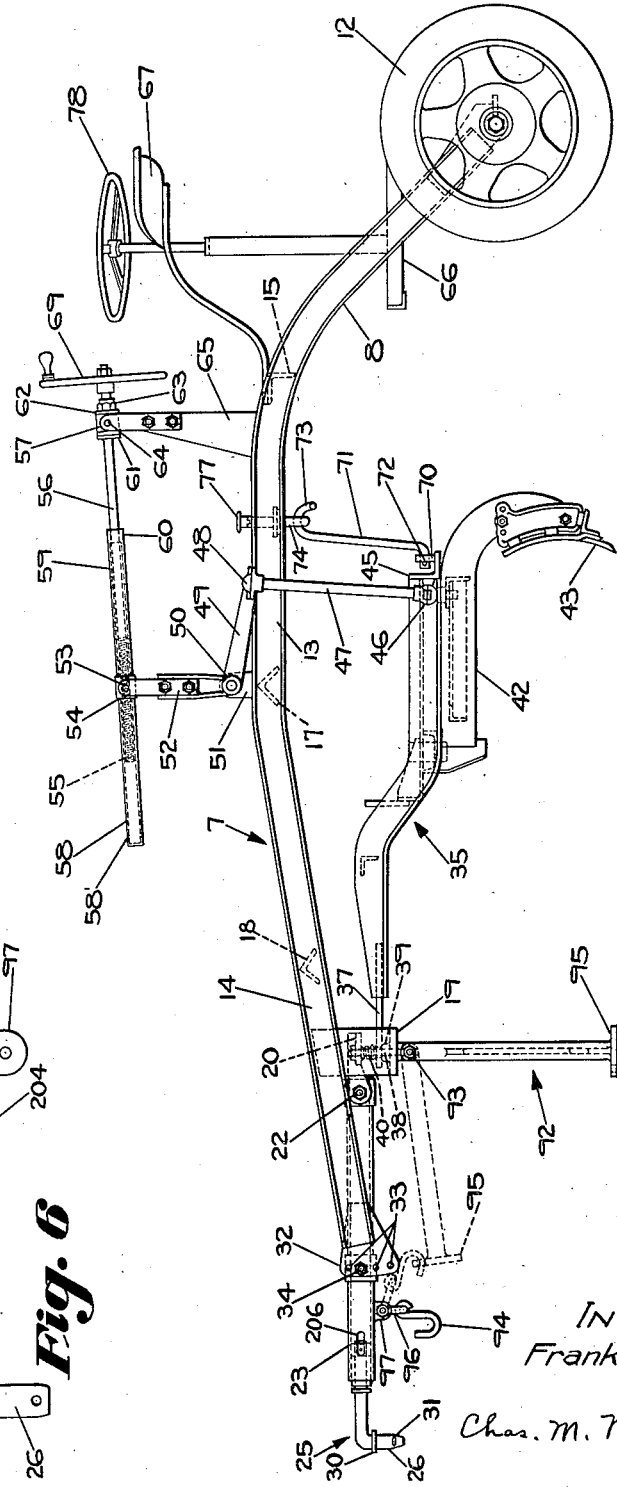
INVENTOR:
Franklin E. Arndt,
By Chas. M. Nissen,
ATT'Y.

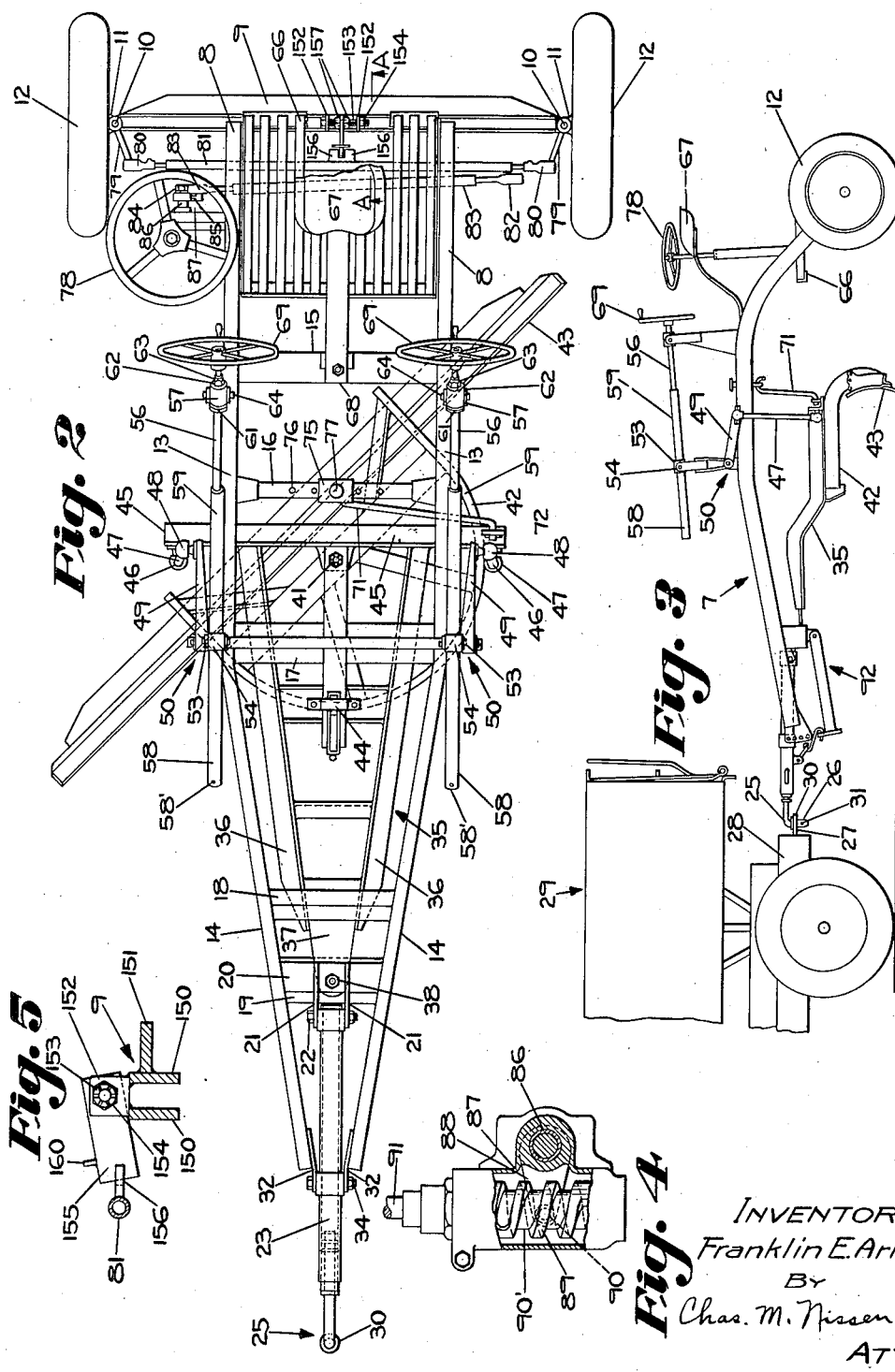

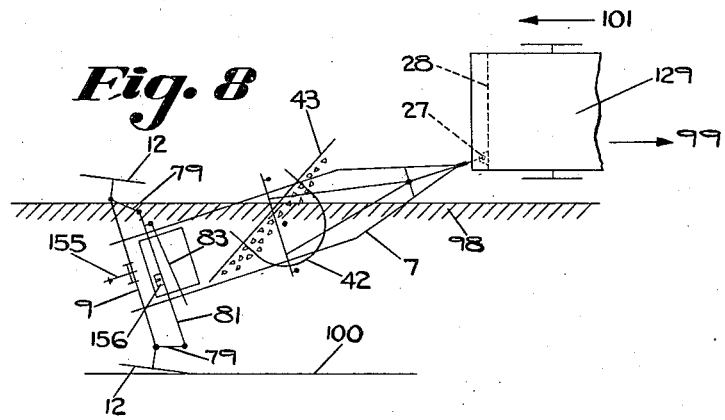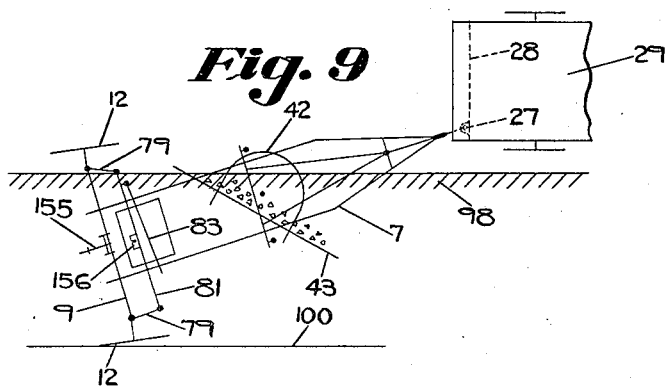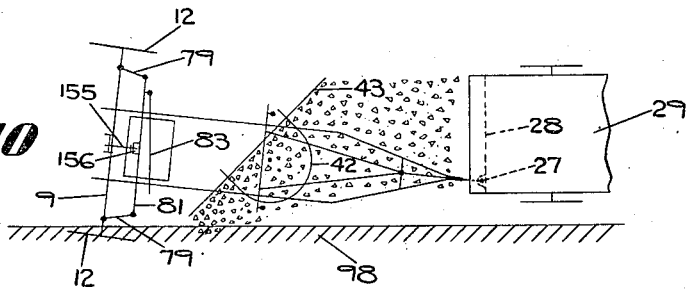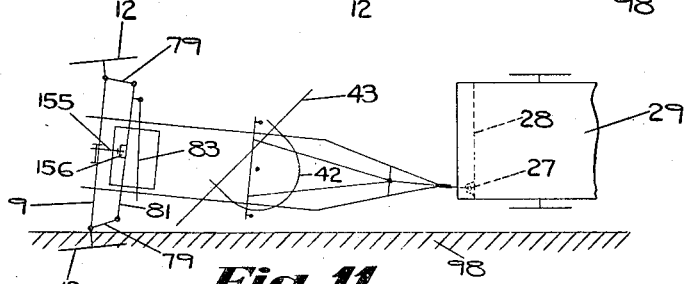

Patented Aug. 24, 1937

2,090,776

UNITED STATES PATENT OFFICE 2,090,776

ROAD GRADER

Franklin E. Arndt, Galion, Ohio, assignor to The Galion Iron Works and Manufacturing Company, a corporation of Ohio Application June 7, 1934, Serial No. 729,432

23 Claims. (Cl. 37—164)

My invention relates to road working machines, particularly of the road grader type, and one of the objects of my invention is the provision of improved and efficient mechanism for finishing or grading the shoulders at the sides of previously built roadways.

Another object of my invention is the provision of an improved road grader which may be detachably connected to a hauling truck and steered by means of mechanism connected to the rear wheels of the grader.

A further object of the invention is the provision in a trailer grader with a mechanism operable from a single operator's station for steering the grader and adjusting the grading mechanism thereof, of means for locking said steering mechanism whereby the trailer grader may be operated without a special operator, or be transported from place to place without requiring an operator for said trailer grader.

Another object of the invention is the provision of a novel ground supporting means for the front end of a trailer grader when it is not connected to a hauling vehicle.

Still another object of the invention is the provision of a load limiting draft mechanism for a trailer grader.

A further object of the invention is the provision of a new mechanism for adjusting the mold-board position of a road grader.

More particularly, it is the object of my invention to provide in a trailer grader adapted to be detachably connected to the rear end of a hauling truck, steering mechanism at the rear end thereof adapted to cooperate with a moldboard and adjusting mechanism therefor, the operation of which may be readily observed by the operator, to direct material onto or off from the shoulder of a hard-surfaced roadway on which the hauling vehicle travels while trailing the grader behind the same, and providing means for locking the steering mechanism whereby the trailer may be transported from place to place with the moldboard lifted into inoperative position, without requiring an operator for said trailer grader.

Other objects of the invention will appear hereinafter, the novel features and combinations being set forth in the appended claims.

In the accompanying drawings,

Fig. 1 is an elevational view of a trailer grader embodying my improvements;

Fig. 2 is a plan view of the machine shown in Fig. 1, with parts broken away;

Fig. 3 is an elevational view of the combination of a dumping truck with the trailer grader shown in Fig. 1;

Fig. 4 is a rear elevational view, partly in section, of certain details of the steering mechanism connected to the rear wheels of the grader;

Fig. 5 is a side elevational view, partly in section, of the steering gear locking mechanism taken along the line A—A in Fig. 2;

Fig. 6 is a side elevational view, partly in section, of the load limiting draft mechanism;

Fig. 7 is a side elevational view, partly in section, of a part of the moldboard adjusting mechanism;

Fig. 8 is a diagrammatic view illustrating the operation of the combination shown in Fig. 3 when material is being scraped laterally of a hard-surfaced roadway on to a shoulder at one side thereof;

Fig. 9 is a diagrammatic view similar to Fig. 8, but illustrating the operation of scraping material on the shoulder at the side of a hard-surfaced roadway toward the latter;

Fig. 10 is a diagrammatic view similar to Fig. 8 but illustrating the operation of scraping material from the central part of a hard-surfaced road toward one edge thereof, for example, while it is being unloaded by the hauling dump truck, from where it may be scraped to the shoulder in a subsequent operation; and Fig. 11 is a diagrammatic view similar to Fig. 8, but illustrating the condition in which the wheels of the trailer grader are locked into position and the moldboard lifted out of operative relation, while the trailer grader is being transported from one place to another.

Referring to Figs. 1 and 2, it will be seen that the supporting frame 7 is upwardly arched intermediate its ends and is downwardly and rearwardly inclined at 8 for attachment to the transverse crosspiece or axle 9 to the ends of which are pivoted at 10, 10 the axle brackets 11, 11 for supporting the rear wheels 12, 12, preferably provided with pneumatic tires.

By referring particularly to Fig. 2, it will be seen that the supporting frame comprises two spaced-apart side members which are horizontal and parallel at their uppermost portions as indicated at 13, 13 and are downwardly inclined and converging at their forward portions as indicated at 14, 14. The side members are rigidly connected together by the rear cross-piece or axle 9 and by the spaced-apart cross-pieces 15, 16, 17, 18 and 19.

The cross-piece 19 is U-shaped, and between the vertical plates thereof is rigidly secured an auxiliary cross-piece 20 spaced above the lower horizontal plate of the cross-piece 19, as shown in Fig. 1. The auxiliary cross-piece 20 is provided with vertical spaced-apart forwardly extending plates 21, 21 between which is pivoted by means of a bolt 22, the rear end of the machine drawbar 23, to the forward end of which is secured the hook 25, the vertical member 26 of which is adapted to fit into a hole in the plate 27 attached to the rear end of the frame 28 of the dumping truck 29, shown in Fig. 3.

A collar 30 on the vertical member 26 of the hook 25 is adapted to rest on top of the plate 27, and a cotter pin 31 at the lower end of the member 26 may be relied upon to lock the hook 25 to the frame 28 of the dumping truck while the trailer grader is in operation as illustrated in Fig. 8, 9, 10 or 11.

At the forward ends of the converging portions 14, 14 of the supporting frame 7 of the machine are attached spaced-apart plates 32, 32 which are preferably each triangular in shape as shown in Fig. 1, and are provided with a series of holes 33 for receiving a bolt 34 to hold the hook 25 at an adjusted elevation relative to the frame 7.

Under the supporting frame 7 is a moldboard drawbar or supplemental frame 35 which tapers or converges forwardly as shown in Fig. 2. Secured to the forward ends of the side members 36, 36 of the moldboard drawbar 35 is a horizontal plate 37 which tapers or converges forwardly and is provided with an opening through which loosely extends the bolt 38. The plate 37 rests on a boss 39 at the center of the upper surface of the horizontal plate of the U-shaped cross-piece 19. A spring 40 is located between the auxiliary cross-piece 20 and the plate 37. This spring surrounds the bolt 38 and urges the plate 37 against the boss 39. The opening in the plate 37 is of sufficient size to permit adjusting movements of the drawbar 35 on the boss 39 on longitudinal and transverse axes.

Pivotally connected at 41 to the rear end of the moldboard drawbar 35 is a circle 42 for supporting the scraper blade or moldboard 43 for adjustment relative to the drawbar 35 on the upright axis of the pivot 41. The circle 42 and the scraper blade or moldboard 43 rigidly attached thereto may be locked in adjusted position to the moldboard drawbar 35 by means of the latch mechanism 44.

At the rear end of the moldboard drawbar 35 is a transverse angle iron 45 to the ends of which are connected by means of the ball and socket joints 46, 46 the lower ends of the vertical hangers 47, 47. The upper ends of the hangers 47, 47 are connected by means of the ball and socket joints 48, 48 to the rearwardly extending arms 49, 49 of the bell cranks 50, 50 which are pivotally mounted on transverse horizontal axes to brackets one of which is shown in elevation at 51 in Fig. 1. The brackets 51 are preferably located on the tops of the forward ends of the horizontal portions 13 of the supporting frame 7 immediately above the ends of the cross-piece 17. To the upper ends of the vertical arms 52 are pivoted at 53, 53 the nuts 54, 54 through which are threaded the screw-threaded inner end portions 55 of the rods 56, 56, the rear and outer ends of which are journaled in the bearings 57, 57.

As best illustrated in Fig. 7, the nuts 54, 54 are provided with tubular extensions 58, 58 forwardly of the pivots 53, 53. These tubular extensions constitute housings for the screw-threaded inner end portions 55 of the rods 56, 56, protecting them from the elements, and providing lubrication pockets therefor. Each of the tubular extensions 58 is preferably provided with an opening 58' at one end thereof adjacent its top portion for the reception of oil and to prevent any possible piston action due to the telescoping of extensions 58, 58 and the end portion 55 of rods 56, 56. The nut 54 is also provided with rearwardly extending tubular portions 59, 59 the rear ends of which are provided with slide bearings 60 for the rods 56, 56. It will thus be seen that the screw-threaded portions 55 with the rods 56, 56 are entirely enclosed by the tubular extensions 55, 55 and 59, 59.

On the rear ends of the rods 56 are spaced collars 61, 61 and 62, 62 held in place by the nuts 63, 63 as shown in Figs. 1 and 2, so that the rods 56, 56 may rotate in the bearings 57, 57 but cannot be moved longitudinally therein. The bearings 57, 57 are pivotally mounted at 64, 64 to the upper ends of brackets 65 mounted on the rear ends of the horizontal portions 13, 13 of the supporting frame 7 adjacent to the cross-piece 15.

Between the rearwardly extending and downwardly inclined portions 8, 8 of the supporting frame is rigidly secured an operator's platform 66 as shown in Figs. 1 and 2. An operator's seat 67 may also be secured at 68 to the center of the cross-piece 15 in position to enable the operator to reach either or both of the wheels 69, 69 which are connected to the rear ends of the screw rods 56, 56. It will thus be seen that the hangers 47, 47 may be individually lifted or lowered by rotating the wheels 69, 69 each of which actuates screw elements cooperating with nut elements to swing the bell cranks 50, 50 on their horizontal transverse axes. The moldboard or scraper 43 may thus be adjusted in elevation and in inclination relative to the surface on which the machine is supported.

Since the forward end of the moldboard drawbar 35 is pivotally connected on a vertical axis to the U-shaped cross-piece 19, and since the hangers are universally connected at their lower ends to the outer ends of the cross-bar 45 and universally connected at their upper ends to the bell cranks, the rear end of the drawbar together with the circle and moldboard or scraper may be shifted laterally relative to the supporting frame 7.

Secured to one end of the cross-bar 45 is a vertical plate 70 which is provided with an opening through which the lower end of the retaining rod 71 extends for pivotal connection to the transverse bar 45. The lower end of the retaining rod 71 may be retained by means of the cotter pin 72 in its pivotal connection to the plate 70. The upper end of the rod 71 is hooked at 73 to extend through an eye 74 suspended from the tubular bracket 75 which is slidable along the cylindrical cross-piece 16. The latter is provided with a series of vertical holes 76 into which is adapted to extend a pin 77 in the tubular bracket 75, to hold the latter in adjusted position. Consequently, after the rear end of the drawbar together with the circle and scraper or moldboard carried thereby have been shifted laterally they may be held in adjusted position by means of the retaining rod 71 and the parts connected thereto, including the pin 77.

It is to be noted that the particular arrangement of the parts provides a clear view of the moldboard or scraper during its operation by the operator on seat 67. Contributing to this feature is the arm 49 which extends rearwardly from its pivot about the longitudinal center of the frame 7. This tends to place the moldboard center toward the rear of the machine. In addition, the mechanism for adjusting the moldboard or scraper is all placed along the sides of the frame 7 whereby it does not obstruct the view of the moldboard by the operator. The cross-piece 15, which supports the seat 67 through an appropriate leaf spring and also provides a foot rest for the operator, is set sufficiently to the rear of the frame 7 so as to avoid obstruction of the operator's vision. In view of this arrangement of parts, the operator is not operating his machine "blind" but at all times can directly observe its immediate operation.

It should be understood that when the trailer grader is detachably hooked to the rear end of a hauling vehicle, steering of the grader is effected by movement of the rear wheels 12, 12 on the vertical pivots 10, 10 while the hauling vehicle is traveling along the roadway. For this purpose a steering wheel 78 is mounted near the operator's platform 66 and near the operator's seat 67 and is connected to the axle brackets 11 by the mechanism shown in Figs. 2 and 4. Connected rigidly to the axle brackets 11, 11 are forwardly extending arms 79, 79, the forward ends of which are connected by ball and socket joints 80, 80 to the transverse steering bar 81. To one end of the transverse steering bar 81 is connected by means of a universal joint 82 the transverse steering shaft 83, the other end of which is pivoted at 84 to the lower end of the arm 85 carried on a shaft 86 from gear casing 87 carrying the lever 88 operated by the spiral cam 89 through pin 90 carried on lever 88 and adapted to ride in the groove 90' formed by the spiral cam 89. The spiral cam 89 is secured to the steering rod or post 91, the lower end of which is mounted in suitable bearings in the casing 87 and the upper end of which is connected to the steering wheel 78. The casing 87 is rigidly secured to one of the side members of the supporting frame, as shown in Fig. 2.

When the grader is detached from a hauling vehicle, the front end thereof may be supported by the foot rest 92, as shown in full lines in Fig. 1. The upper end of the foot rest 92 may be pivoted at 93 to the bottom of the U-shaped crosspiece 19.

When the grader is in operation, the foot rest 92 may be swung to its dotted line position shown in Fig. 1 and held in such position by means of a hook 94 extending through a hole in the bottom plate 95 of the foot rest. The hook 94 may be connected to a clevis 96 pivotally connected at 97 to the bottom of the machine or trailer drawbar 23.

Referring particularly to Fig. 6, there is seen a drawbar gear for limiting the load which may be applied to the scraper or moldboard 43 to prevent injury thereto. The trailer drawbar 23 is provided with an internal sleeve bearing 200 rigidly attached to trailer drawbar 23, as by welding at 201.

Hook 25 is provided with an integral extension 202 and a flange 203 intermediate its ends. Extension 202 is movably mounted in sleeve bearing 200 and its rearward movement with respect to said bearing is restricted by flange 203. At the rear end, said extension 202 carries a removable collar 204 normally held fast thereto by a sheer pin 205. The forward face of said collar 204 normally abuts the rear face of sleeve 200.

It is thus seen that the draft is transferred from the hook 25 to the trailer drawbar 23 by a draft gear including as one element the sheer pin 205. Should an excessive load be placed on the scraper or moldboard, as by its striking some solid object, the sheer pin 205 will sheer and prevent damage to the grader trailer. The trailer drawbar 23 is provided with an elongated aperture 206 to provide access for the removal or insertion of a new sheer pin 205.

Referring particularly to Figs. 2 and 5, there is seen the mechanism for adjustably locking the wheels 12 in a fixed position whereby the grader trailer may be transported from one position to another without requiring a separate operator, the trailer grader then merely operating as a trailer to follow the truck 29.

Rigidly attached to the transverse crosspiece 9, which comprises the axle of the trailer grader with parallel uprights 150, 150 and horizontal reinforcing webs 151, as by welding, are a pair of spaced-apart upright brackets 152, 152. Said brackets 152, 152 are substantially centrally apertured to loosely receive a threaded bolt 153 held rigid in said uprights by a nut 154. Pivotally carried on said bolt 153 is an arm 155 adapted to be dropped between spaced lugs 156, 156 carried on the steering bar 81, and to hold said bar 81 against movement. Carried by the threaded bolt 153 on both sides of said arm 155 are nuts 157, 157 which may be adjusted on said bolt 153 and thereby variably determine the position of the wheels 12 when locked. This provides for the proper trailing of the trailer grader for several possible lateral positions at which the hook 25 may be attached to the truck.

The arm 155 may be provided with a cross piece 160 which provides a handle therefor and also provides a rest which is carried on member 151 when the arm 155 is in the non-locking position. As is evident from Figs. 2 and 5, when the arm 155 is in the position indicated the steering bar 81 is locked against movement and in turn the wheels 12 are locked against any pivotal movement.

The operation of the trailer grader shown in Figs. 1, 2 and 3 is illustrated diagrammatically in Figs. 8, 9, 10 and 11.

When the front end of the frame 7 is pivotally hooked to plate 27 at the rear end of the frame 28 of the truck 29 at that corner thereof adjacent the edge 98 of the previously built or hard-surfaced roadway, while traveling in the direction of the arrow 99, material may be moved by means of moldboard or scraper 43 laterally of the roadway on to the shoulder located between the lines 98 and 100. During operation of the grader to finish the shoulder at one side of the roadway, the traffic on the roadway moving in the direction of the arrow 101 need not be interfered with.

Inasmuch as the inclination of the moldboard or scraper 43 when operating on material as indicated in Fig. 8, tends to swerve the frame 7 toward the center of the roadway, the steering mechanism is so operated as to incline the wheels 12, 12 as indicated in Fig. 8. That is to say, the axles of the wheels 12, 12 are tilted in a clockwise direction relative to the longitudinal lines 98 and 100 to counteract the tendency of the operating mold board to swerve the frame 7 in the opposite direction, the resultant movement of the moldboard being in a longitudinal direction along the line 98 while the moldboard is held in its adjusted position relative to the frame 7.

The steering mechanism may also be operated to hold the trailer grader in a trailing position directly back of the truck so that the dumping mechanism of the latter may be operated to gradually unload road building material therefrom while the scraper or moldboard moves such material off the roadway on to the shoulder. This operation is diagrammatically illustrated in Fig. 10 of the drawings. In this operation, a separate operator for the trailer grader may not be essential, and by locking the wheels 12, 12 by the above described mechanism, he may be dispensed with. This may be followed by another operation such as that illustrated in Fig. 8, to spread and grade the material along the shoulder between the lines 98 and 99.

When it is desired to scrape material from the outer portion of the shoulder toward a depression at the edge of the roadway, the moldboard or scraper may be adjusted to the position shown in Fig. 9 when the tendency will be for the moldboard to swerve the rear end of the frame 7 away from the roadway on which the truck 29 travels. Consequently, the steering mechanism is so operated under these circumstances as to tilt the rear wheels to travel toward the center line of the roadway. That is to say, the wheels are tilted in such a direction as to counteract the swerving tendency due to the moldboard, the resultant movement being along lines parallel to the edge 98 of the roadway while the moldboard is held in adjusted position relative to the supporting frame 7.

In each of the three operating conditions illustrated in Figs. 8, 9 and 10, the scraper or moldboard was in a lowered position adapted to do useful work. When the moldboard is raised to an inoperative position and the trailer grader is to be transported from one place to another by the truck 29, the steering wheels 12 are locked in position by the above described locking means. This condition is diagrammatically illustrated in Fig. 11. As is readily seen from Fig. 11, in order to provide for the proper trailing of the grader trailer when it is hooked to one side of the truck frame, as at 27, the wheels 12 must be locked in a tilted position different from that required in the operation illustrated in Fig. 10. This is provided by the adjustable features of the locking means, particularly the threaded bolt 153 and the nuts 157, 157. As the grader trailer will, in general, have a wider wheel gauge than the truck, the locking mechanism may be set to allow one of the wheels 12 to run on the shoulder during transportation thereof. However, if desired, this locking mechanism may be set so that both wheels 12 will travel on the hard surface road when the trailer grader is transported behind the truck without an operator on the seat 67.

Inasmuch as it is well known that the conventional truck used on highways in road building work is of the motor or self-propelled type and operable at relatively high speeds under the control of a single operator, it is obvious that when the attachment shown in the accompanying drawings is hooked to such a truck with the steering mechanism for the wheels 12, 12 locked in position for transportation, and the moldboard held in elevated position for ample clearance of the road surface, as illustrated diagrammatically in Fig. 11, the trailer unit may be quickly taken to any place on a highway by a single operator, particularly in cases of emergency. That is to say, by reason of the ready attachment of such a trailer unit to a motor truck at adjusted elevation to support the front end of the frame in such position that the moldboard will have ample clearance relative to the road surface, rapid portability from job to job for quick restoration of the contours of shoulders of the highway is available, because the same motor truck that is used for such rapid portability to the shoulders needing repair is also useful for pulling the grader unit during its shoulder restoring operations. The hitch connection at 22, 32, 33, 34 is adjustable not only for height of the truck frame for transportation but also for shoulder grading operations, and the pin 31 prevents detachment of the trailer unit from the truck and therefore assurance is had that during grading operations, the moldboard will be held down to its work.

It will thus be seen that the trailer grader unit is particularly adapted for rapid portability from one place along the roadway to another and for quickly restoring the contour of shoulders whenever and wherever repair may be necessary, although located at widely spaced points along the highway. Soft shoulders out of repair are not only a dangerous hazard to automobile traffic on the hard surfaced pavement between such shoulders, but the traffic that moves off and on the edges of the pavement where the shoulders need repairing, is very destructive of the pavement itself. The readiness with which the trailer grader unit may be attached to any motor truck available irrespective of the elevation of its frame from the road surface, and its small weight notwithstanding its full range of adjustments for grader work, renders the trailer unit well adapted for quick transportation to places where emergencies require quick repair of shoulders to remove dangerous hazards to traffic.

The same motor truck used for transportation may also be used for traction when the grader unit is operated along the shoulder, but during such operations it is preferable that an additional operator be relied on to control the steering of the rear wheels, 12, 12, while he sits on the seat 67, with the cutting blade 43 under his direct observation and with the moldboard adjusting wheels 69, 69 within his reach. Such additional operator need not, however, occupy the seat 67 during rapid transportation of the trailer grader unit along the highway because during such rapid transportation the locking mechanism illustrated at 155 may be relied on to hold the wheels 12, 12 in proper trailing positions.

Obviously those skilled in the art may make various changes in the details and arrangement of parts without departing from the spirit and scope of the invention as defined by the claims hereto appended, and I therefore wish not to be restricted to the precise construction herein disclosed.

Having thus described and shown an embodiment of my invention, what I desire to secure by Letters Patent of the United States is:

1. In a road-working machine, the combination with a supporting frame, of means for supporting the same for travel along a roadway, a road-working implement adjustably mounted on said frame, mechanism comprising hangers at opposite sides of said frame and flexibly connected at their lower ends to said road-working implement, bell-cranks having their lower arms flexibly connected to the upper ends of said hangers, nut and screw elements, operator's wheels connected to said screw elements to rotate the same, enclosing tubes for the nut elements, and pivotal connections between the upper arms of said bell-cranks and said enclosing tubes intermediate the ends of the latter.

2. In a road-working machine, the combination with a supporting frame, of a supplemental frame connected thereto, a road-working implement carried by said supplemental frame, upright hangers at opposite sides of said supporting frame for adjusting said supplemental frame and the road-working implement carried thereby, bell-cranks pivoted to the top of said supporting frame with the lower arms thereof extending longitudinally and the upper arms extending vertically, pivotal connections between the lower arms and the upper ends of said hangers, nut elements pivotally connected to the upper ends of said vertical arms, screw elements extending through said nut elements, means for rotating said screw elements individually, and tubular enclosures for said nut and screw elements and extending forwardly and rearwardly of the upper ends of said vertical arms.

3. In a road-working machine, the combination with a supporting frame, of a road-working implement mounted thereon for adjustment relative thereto, nut and screw elements for adjusting said road-working implement, a telescopic enclosure for said nut and screw elements and comprising tubes with the nut elements located intermediate the ends thereof, means pivotally connected to said tubes at the points where said nut elements are located for connecting the nut elements to said road-working implement, and means for operating said screw-elements through said nut elements while projecting in opposite directions from said nut elements in said tubes.

4. In a road grader, the combination with a supporting frame, of means for supporting said frame for travel along a roadway, a supplemental frame flexibly connected at its front end to the forward portion of said supporting frame, a moldboard adjustably carried by said supplemental frame, hangers at opposite sides of said supporting frame and flexibly connected at their lower ends to said supplemental frame, bell-cranks pivoted to the top of said supporting frame and having longitudinally extending arms flexibly connected to the upper ends of said hangers, closed tubular nut elements pivotally connected intermediate their ends to the upper ends of upright arms of said bell-cranks, tubular bearings pivotally connected to said supporting frame, screw elements journaled in said bearings for rotation only and extending into said nut elements, and wheels connected to said screw elements to rotate the same individually to effect lifting or lowering of either hanger individually.

5. In a road-working machine, the combination with a supporting frame, of a supplemental frame, a road-working implement carried thereby, a U-shaped cross-piece secured to said supporting frame and comprising a bottom plate, an auxiliary cross-piece spaced above said bottom plate, a pivot pin between said bottom plate and said auxiliary cross-piece for pivotally connecting the front end of said supplemental frame to said U-shaped cross-piece, and a spring between the pivoted end of said supplemental frame and the bottom of said auxiliary cross-piece.

6. In a road-working machine, the combination with a supporting frame, of wheels at the rear end thereof, a road-working implement carried by said frame, a sectional combination support and drawbar at the front end of said frame adapted to be detachably connected to a hauling vehicle to be pulled and supported thereby, said drawbar comprising a rod section telescoping into a tubular section, and a shearing connection between the sections of said drawbar and rendered accessible by an opening in said tubular section.

7. In a road-working machine, the combination with a supporting frame comprising spaced-apart side beams converging toward each other at their forward ends, of wheels for supporting the rear end of said frame, a cross-piece connecting the converging side beams near the front end of said frame, a drawbar pivotally connected to said cross-piece and extending forwardly between the forward ends of said side beams, spaced-apart vertical plates secured to the front ends of said side beams at the side of said drawbar, and mechanism for securing said drawbar to said plates at adjusted elevation relative to the front end of the supporting frame.

8. In a road working machine, the combination with a supporting frame, of means for supporting the same for travel along a roadway, a moldboard adjustably mounted on said frame, mechanism comprising hangers at opposite sides of said frame and flexibly connected at their lower ends to said moldboard, bell cranks pivoted to said frame and having their lower arms flexibly connected to the upper ends of said hangers, nut and screw elements, mechanism connected to said screw elements to rotate the same, tubes extending in opposite directions from said nut elements to serve as housings for said screw elements, and pivotal connections between the upper arms of said bell cranks and the opposite sides of said nut elements between the oppositely extending tubes.

9. A road-working machine comprising a frame, a road-working implement adjustably mounted thereon, means comprising a hanger flexibly connected at its lower end to said road-working implement, a bell crank pivoted to said frame and having one arm flexibly connected to the upper end of said hanger, nut and screw elements, a pivotal connection between the other arm of said bell crank and the nut element, housings for the screw element connected to said nut element to extend in opposite directions therefrom, and mechanism for rotating the screw element to actuate said bell crank on its pivot to effect adjustment of said road-working implement relative to said frame.

10. In a road-working machine, the combination with a supporting frame, of means for supporting the same for travel along a roadway, a road-working implement adjustably mounted on said frame, a hanger flexibly connected at its lower end to said road-working implement, a bell crank having its lower arm flexibly connected to the upper end of said hanger, nut and screw elements, mechanism connected to the screw element to rotate the same, a tubular enclosure for the nut element, and a pivotal connection between the upper arm of the bell crank and the tubular enclosure intermediate the ends of the latter.

11. In a road-working machine, the combination with a supporting frame, of a supplemental frame connected thereto, a road-working implement carried by said supplemental frame, an upright hanger flexibly connected at its lower end to the road-working implement, a bell crank pivoted to the top of said supporting frame with the lower arm thereof extending longitudinally and the upper arm extending vertically, a pivotal connection between the lower arm and the upper end of said hanger, a nut element pivotally connected to the upper end of said vertical arm, a screw element extending through said nut element, mechanism for rotating said screw element, and a tubular enclosure for the nut and screw elements and extending forwardly and rearwardly of the upper end of the vertical arm.

12. A road-working machine comprising a main frame and a supplemental frame, a road-working implement carried by said supplemental frame, a hanger flexibly connected at its lower end to said supplemental frame, a bell crank one arm of which is flexibly connected to the upper end of said hanger, a nut element pivotally connected to the other arm of said bell crank, a screw element threaded through said nut element, a shaft for rotating said screw element, a tubular enclosure for said nut and screw elements, a slide bearing at one end of said tubular enclosure for said shaft, means for supporting said shaft for rotation, and a wheel for rotating said shaft.

13. In a road-working machine, the combination with a frame, of supporting wheels for the rear end thereof, mechanism at the forward end of said frame for detachably connecting the same to a hauling vehicle, said mechanism comprising a drawbar pivotally connected to a cross-bar on said frame, a foot-rest pivotally connected to said cross-bar adjacent to the pivot of said drawbar, and means carried by said drawbar for supporting said foot-rest up off the ground when said drawbar is operatively connected to the hauling vehicle.

14. In a road-working machine, the combination with a frame, of wheels for supporting the rear end thereof, mechanism at the forward end of said frame for detachably connecting the same to a hauling vehicle, said mechanism comprising a drawbar pivotally connected to a cross-bar on said frame, a foot-rest pivoted to said cross-bar adjacent to the pivot of said drawbar, a road-working implement, a supplemental frame for supporting said road-working implement, and means comprising a flexible connection between said supplemental frame and said cross-bar adjacent to said pivots for adjustably supporting the said supplemental frame and said road-working implement in predetermined relation to the surface of the roadway.

15. In a road-working machine, the combination with a supporting frame, of spaced-apart cross-pieces rigidly connected to said frame, a vertical pivot pin connecting said cross-pieces, a supplemental frame pivotally connected at its front end to said pivot pin between said cross-pieces, a spring on said pivot pin between the front end of said supplemental frame and one of said cross-pieces, a road-working implement carried by said supplemental frame, and means between said frames for effecting adjustment of the supplemental frame and said road-working implement.

16. In a device of the class described, the combination with a main frame, of means for supporting the rear end thereof, a U-shaped cross-piece rigidly connected to the forward portion of said frame and comprising a bottom plate, an auxiliary cross-piece rigidly connected to said U-shaped cross-piece and spaced above said bottom plate, a drawbar adjustably connected intermediate its ends to the forward end of said frame and pivoted at its rear end to said auxiliary cross-piece, a foot-rest pivoted to said bottom plate and adapted to swing upwardly off the ground, means for holding the foot-rest in suspended position off the ground, a vertical pivot pin connecting said bottom plate and said auxiliary cross-piece, a supplemental frame pivotally connected at its forward end to said vertical pivot pin, a road-working implement carried by said supplemental frame, and means on said supporting frame connected to said supplemental frame to effect adjustment of said road-working implement by moving the same relatively to said supporting frame on the pivotal connection between the forward end of said supplemental frame and said vertical pivot pin.

17. In a road working machine, the combination with a supporting frame comprising spaced-apart side members, of wheels for supporting the rear end of said frame, a cross-piece connecting said side members rearwardly of the front end of said frame, a machine drawbar pivotally connected at its rear end to said cross-piece intermediate the ends of the latter and extending forwardly for detachable connection to a hauling vehicle, means between the front ends of said side members and said machine drawbar for supporting the front end of the latter at adjusted elevation relative to said frame, a moldboard, a moldboard drawbar for said moldboard, a connection between the front end of said moldboard drawbar and said cross-piece intermediate the ends of the latter, and mechanism on said frame connected to said moldboard drawbar to effect adjustment of the moldboard relative to said frame.

18. In a road working machine, the combination with a supporting frame comprising spaced-apart side members converging toward each other at their forward end portions, of wheels for supporting the rear end of said frame, a cross-piece rearwardly of the front end of said frame between said converging side members, a machine drawbar pivotally connected at its rear end to said cross-piece, means for adjustably connecting said machine drawbar intermediate its ends to the front ends of said side members to hold the front end of said machine drawbar at adjusted elevation relative to said frame, a moldboard, a moldboard drawbar pivotally connected at its front end to said cross-piece, and mechanism on said frame and connected to said moldboard drawbar to effect adjustment of the moldboard relative to said frame, the connections between said drawbars and said side members being constructed and arranged to afford a direct pulling connection between said machine drawbar and said moldboard drawbar.

19. In a road working machine, the combination with a supporting frame having an upwardly arched portion, of wheels connected to the rear end of said frame, steering mechanism connected to said wheels, a road working implement carried by said frame under said upwardly arched portion, a drawbar pivoted at its rear end to said frame rearwardly of its front end, means adapting the front end of said drawbar for pivotal connection to a hauling vehicle for freedom of lateral movement of the rear end of said frame through a wide angle, and mechanism between the said frame and said drawbar intermediate the ends of the latter for adjusting the elevation of the road working implement relative to the road surface for rapid transportation by means of such hauling vehicle.

20. In a road working machine, the combination with a supporting frame comprising spaced-apart side beams converging toward each other at their forward ends, of wheels for supporting the rear end of said frame, a road working implement carried by said frame, a drawbar pivotally connected to said frame rearwardly of its front end and located between the converging front ends of said beams and extending forwardly beyond the same, mechanism between the front ends of said beams and said drawbar intermediate the ends of the latter to hold the front end of said drawbar at adjusted elevation relative to said frame, mechanism at the front end of said drawbar for detachably connecting the same to a hauling vehicle, and mechanism carried by said frame for adjusting the elevation of said road working implement relative to the road surface independently of the adjustment between the frame and the drawbar, the construction and arrangement being such that the aforesaid adjustments co-operate to support the road working implement to clear the road surface during rapid transportation and to hold the road working implement to its work during road working operations.

21. In a road working machine, the combination with a supporting frame, of wheels for supporting the rear end of said frame, a road working implement carried by said frame, a drawbar pivotally connected to said frame for adjustment in elevation of the front end thereof relative to said frame, means at the front end of said drawbar adapting the same for pivotal connection to a hauling vehicle to secure support of the front end of said frame by said hauling vehicle, mechanism between said frame and said drawbar intermediate the ends of the latter to hold the front end of the drawbar at adjusted elevation relative to said frame, mechanism carried by said frame for adjusting the elevation of the road working implement relative to the road surface independently of the adjustment between the frame and the drawbar, steering mechanism connected to said wheels for control from an operator's station on the rear portion of said frame from which station the adjusting mechanism for the road working implement is also operable, and releasable locking means for the steering mechanism to hold the said wheels in trailing positions when such hauling vehicle rapidly transports the machine along the roadway while said drawbar and road working implement adjustments co-operate to support the road working implement with ample clearance from the road surface.

22. In an attachment to a truck adapted to co-operate therewith to form a road shoulder grader, the combination with a vehicle frame having an upwardly arched portion, of a pair of steering wheels pivoted on upright axes to the rear end of said frame, an operator's station on said frame, steering mechanism connected to said steering wheels and operable from said operator's station, a moldboard carried by said frame under said upwardly arched portion, a machine drawbar, means adapted to readily connect and disconnect the forward end of said drawbar to a truck, mechanism between said drawbar and the forward end of said frame for connecting said drawbar to said frame with the forward end of said drawbar at adjusted elevation relative to the said vehicle frame so as to be at adjusted elevation relative to the road surface, the front end of the frame being solely dependent for its support on the drawbar and its connections to the truck and to the vehicle frame during the operation of the moldboard, and means operable from the operator's station for adjusting the elevation relative to the road surface of either end of the moldboard independently of the other end, the construction and arrangement being such that when the vehicle frame is towed by said truck with the front end of said frame supported by the drawbar and the truck frame the operator at his station may effect steering of the rear end of the vehicle frame through a wide angle onto a shoulder at one side of the path of travel of the truck for operation of the moldboard on such shoulder and the operator during such operation may vary the depth and transverse inclination of the moldboard cut and vary the steering accordingly to maintain the moldboard path of travel along said shoulder at one side of the path of travel of the truck.

23. In an attachment to a truck adapted to co-operate therewith to form a road shoulder grader, the combination with a vehicle frame having an upwardly arched portion, of steering wheels connected to the rear end of said frame, an operator's station on said frame, steering mechanism connected to said wheels and operable from said station, a road working implement carried by said frame under said upwardly arched portion, a drawbar pivoted at its rear end to said frame rearwardly of its front end, means adapting the front end of said drawbar for pivotal connection to a towing truck for freedom of lateral movement of the rear end of said frame through a wide angle, mechanism between the front end of said frame and said drawbar intermediate the ends of the latter for holding the front end of the drawbar at adjusted elevation relative to said vehicle frame, the front end of said vehicle frame being solely dependent for its support on the drawbar and its connections to the truck and to the vehicle frame during the operation of the road working implement, and means for adjusting from the operator's station the elevation of the road working implement relative to the road surface, the construction and arrangement being such that when the vehicle frame is being towed by said truck with the front end of the frame supported by the drawbar and the truck frame the operator at his station may effect steering of the rear end of the vehicle frame through a wide angle onto a shoulder at one side of the path of travel of the truck for operation of the road working implement on such shoulder and the operator during such operation may vary the depth and transverse inclination of the road working implement action and vary the steering accordingly to maintain the road working implement path of travel along said shoulder at one side of the path of travel of the truck.

FRANKLIN E. ARNDT.